United States Patent
Qian et al.

(10) Patent No.: US 8,429,204 B2
(45) Date of Patent: Apr. 23, 2013

(54) SHORT POINT-OF-INTEREST TITLE GENERATION

(75) Inventors: Jiang Qian, Mountain View, CA (US); Vincent Zhou, Beijing (CN); Bo Zheng, Beijing (CN); Yu Zheng, Beijing (CN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/549,340

(22) Filed: Jul. 13, 2012

(65) Prior Publication Data

US 2012/0278360 A1 Nov. 1, 2012

Related U.S. Application Data

(63) Continuation of application No. 13/266,614, filed as application No. PCT/CN2009/000475 on Apr. 29, 2009.

(51) Int. Cl.
G06F 17/30 (2006.01)
G06F 17/28 (2006.01)

(52) U.S. Cl.
USPC ........................................ 707/804; 715/254

(58) Field of Classification Search .................. 707/693, 707/755, 802–804, 999.102; 715/225, 254; 702/16
See application file for complete search history.

(56) References Cited

U.S. PATENT DOCUMENTS

| | | | |
|---|---|---|---|
| 6,336,111 B1 * | 1/2002 | Ashby et al. ................... | 707/715 |
| 6,405,123 B1 * | 6/2002 | Rennard et al. ................ | 701/410 |
| 7,765,475 B2 * | 7/2010 | Ur et al. .......................... | 715/256 |
| 8,001,482 B2 * | 8/2011 | Bhattiprolu et al. ........... | 715/777 |
| 8,073,845 B2 * | 12/2011 | Homma et al. ................ | 707/723 |
| 8,180,764 B2 * | 5/2012 | Ryu et al. ....................... | 707/722 |
| 8,225,201 B2 * | 7/2012 | Michael ......................... | 715/254 |
| 2007/0229311 A1 * | 10/2007 | Bowman et al. .......... | 340/995.14 |
| 2007/0233379 A1 * | 10/2007 | Bowman et al. .............. | 701/211 |
| 2008/0276167 A1 * | 11/2008 | Michael ......................... | 715/273 |
| 2009/0098888 A1 * | 4/2009 | Yoon ........................... | 455/456.2 |

FOREIGN PATENT DOCUMENTS

| | | |
|---|---|---|
| CN | 101013438 A1 | 8/2007 |
| CN | 101029825 A | 9/2007 |
| CN | 101299217 A | 11/2008 |
| WO | WO 2005/032177 A1 | 4/2005 |

OTHER PUBLICATIONS

PCT International Search Report and Written Opinion, PCT/CN2009/000475, Feb. 11, 2010, 6 Pages.

* cited by examiner

*Primary Examiner* — Robert Timblin
(74) *Attorney, Agent, or Firm* — Fenwick & West LLP

(57) ABSTRACT

Short POI titles are generated by removing unnecessary administrative area prefixes from existing POI titles and replacing necessary administrative area prefixes with shorter aliases. Administrative area prefixes are identified and analyzed to determine whether they are necessary. The analysis includes determining (1) whether the remainders with the prefixes excluded include a common suffix as a prefix, and (2) whether the remainders are unique in an applicable metropolis area. If a remainder does not include as a prefix a common suffix and is unique in the applicable metropolis area, the corresponding prefix is determined unnecessary and removed from the existing POI title to generate a short POI title. Otherwise, the corresponding prefix is determined necessary and replaced with a shorter alias to generate a short POI title.

21 Claims, 10 Drawing Sheets

SHORT POINT-OF-INTEREST TITLE GENERATION

RELATED APPLICATIONS

This application is a continuation of and claims priority to U.S. application Ser. No. 13/266,614, filed on Oct. 27, 2011, which is a national phase application of PCT/CN2009/000475, entitled "Short Point-of-Interest Title Generation," filed on Apr. 29, 2009, the disclosures of which are all hereby incorporated by reference in their entirety for all purposes.

BACKGROUND

1. Field of Disclosure

The disclosure generally relates to the field of text processing for maps, and in particular to shortening geographic location titles on maps.

2. Description of the Related Art

Geographic and political areas typically are divided and subdivided into a hierarchy of administrative areas (or units) at various different levels. For example, China is divided into provinces (or autonomous regions, municipalities), each of the provinces is subdivided into cities (or prefectures), and each of the cities is subdivided into districts (or counties).

A geographic point of interest, or POI, often falls within several administrative areas of different levels of the hierarchy. For example, Fuzhou city No. 5 Middle School is located in China (country level), Fujian province (province level), Fuzhou city (city level), and Gulou district (district level). As a result, a POI title (or name, label) often contains an administrative area prefix identifying the multiple administrative areas the associated POI locates within. For example, the Fuzhou city No. 5 Middle School may bear any of the following English titles: "Fujian Province Fuzhou City Guluo District No. 5 Middle School", "Fujian Province Guluo District No. 5 Middle School", "Fuzhou City Guluo District No. 5 Middle School", and "Guluo District No. 5 Middle School". The POI titles in other language, such as Chinese, similarly commonly include such administrative area prefixes.

The administrative area prefix of a POI title may be redundant and cause the title unnecessarily long. For example, in a city map of the Fuzhou City, the prefix of "Fujian Province Fuzhou City" in the title "Fujian Province Fuzhou City No. 5 Middle School" is unnecessary because the viewer can infer the fact that the school is located in Fujian province and Fuzhou city from the context of the map.

It is beneficial to keep POI titles short because long POI titles are hard to read and take extra space when displayed on a map, thereby reducing the number of POIs that can be displayed in a given area on the map. Because administrative area prefixes cause long POI names, it is desirable to remove unnecessary administrative area prefixes from POI titles. However, administrative area prefixes sometimes are necessary to properly identify the underlying POIs (e.g., "Beijing University"). Therefore, it is difficult to determine whether a given administrative area prefix of a POI title can be removed to shorten the POI title.

Traditionally shortened POI titles are generated by human editors and thus are subject to human errors. In addition, this approach is expensive, labor-intensive, and insufficient for large-scale POI title generation.

SUMMARY

Embodiments of the present disclosure include a method (and corresponding system and computer program product) for generating short POI titles.

One embodiment of the present invention is a computer-implemented method for generating a short title for a geographic point-of-interest (POI). A list of common POI suffixes is stored, where the POI suffixes appear in titles of a plurality of POIs. Aliases of a city, a province within which the city locates, and a plurality of districts within the city are stored. A POI is identified within one of the plurality of districts. The POI has a title including a prefix and a suffix. The prefix of the title of the POI is matched with an alias of at least one of the province, the city, and the district. The remainder of the title, that is the portion excluding the matched prefix, is then compared to the list of common POI suffixes to find a matching suffix. If the remainder does not include as a prefix any suffix in the list of common POI suffixes, then the prefix is removed from the title of the POI, leaving the remainder portion. This portion can then be included in a display on a map, or in some other representation, such as driving directions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The following disclosure and accompanying Figures (FIGS.) describe embodiments generating short titles for POIs located within the People's Republic of China. However, these embodiments are described by way of illustration only. One skilled in the art will readily recognize from the following description that alternative embodiments of the structures and methods illustrated herein may be employed without departing from the principles described herein. For example, the embodiments can be applied to generate short titles in languages other than English (e.g., Chinese) for POIs located within China or elsewhere (e.g., other country/region). Reference will now be made in detail to several embodiments, examples of which are illustrated in the accompanying figures. It is noted that wherever practicable similar or like reference numbers may be used in the figures and may indicate similar or like functionality.

System Environment

Figure 1:
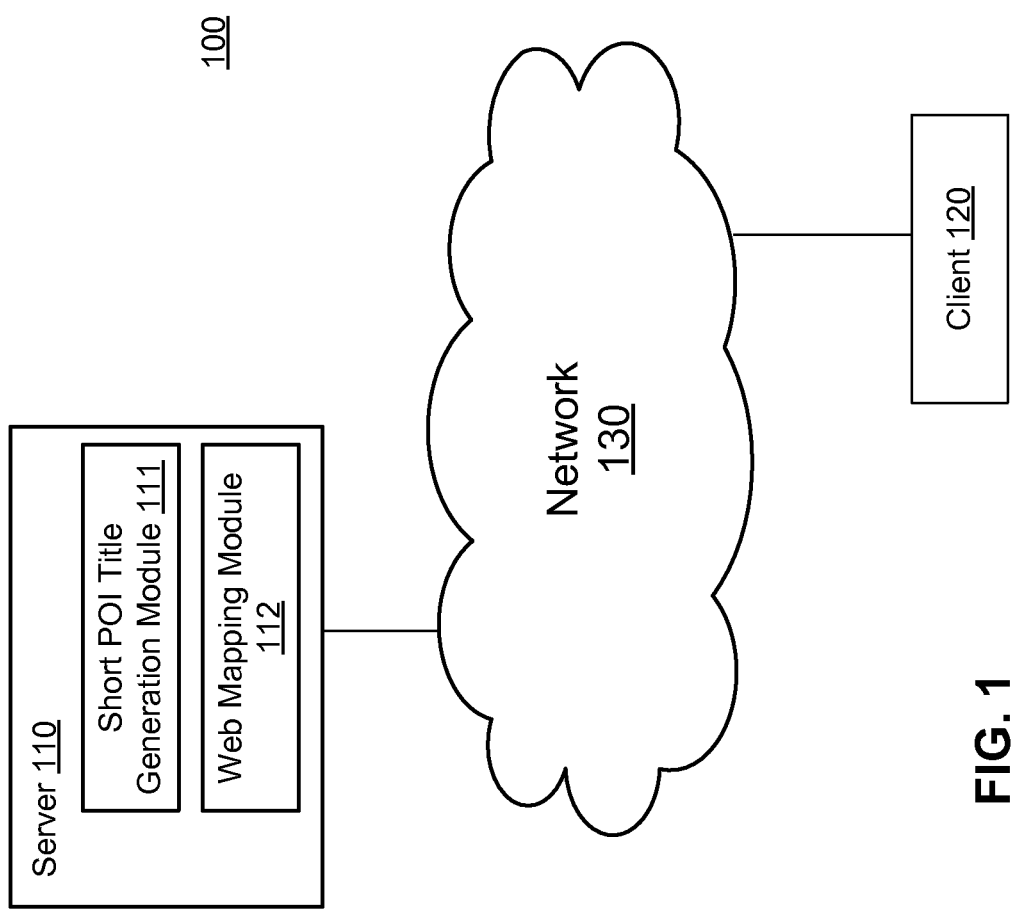
FIG. 1 is a high-level block diagram of a computing environment according to one embodiment of the present disclosure.

FIG. 1 is a high-level block diagram that illustrates one embodiment of computing environment 100 for generating and distributing short POI titles. As shown, the computing environment 100 includes a server 110 and a client 120 connected by a network 130. Only one of each entity is illustrated in order to simplify and clarify the present description. There can be other entities in the computing environment 100 as well.

The server 110 is a server computer system configured to provide the client 120 with a geographic-related service that includes providing POI titles to a user of the client 120. Examples of the geographic-related service include web mapping service, geographic location search (e.g., POI search), transit routing, driving and navigation directions, location-based services (e.g., advertisements, "friend finders", e911 and so forth). In one embodiment, the server 110 includes a web mapping module 112 that generates maps and delivers to the client 120 upon request. The generated maps include indicators and titles of POIs located within the maps. One example of the web mapping server is Google Maps. As shown in FIG. 1, the server 110 includes a short POI title generation module 111.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable storage device (e.g., hard disk), loaded into the memory, and executed by one or more processors included as part of the server 110. Alternatively, hardware or software modules may be stored elsewhere within the server 110. The server 110 includes hardware elements necessary for the operations described here, including one or more processors, high speed memory, hard disk storage and backup, network interfaces and protocols, input devices for data entry, and output devices for display, printing, or other presentations of data. The operations of the server 110 and its modules will be further described below with respect to FIG. 2 and the remaining figures. As will become apparent, the various data processing operations described herein are sufficiently complex and time consuming as to require the operation of a computer system such as the server 110.

The short POI title generation module 111 executes on the server 110 to generate short POI titles for the geographic-related service provided by the server 110 to the client 120. The short POI title generation module 111 has access to a data store of POI information. Each POI is associated with information such as location (e.g., longitude and latitude, address), type (e.g., governmental agencies, educational institutes, retail establishments, etc.), description (e.g., amenities, rating, comments, price, etc.) and a title. The short POI title generation module 111 generates short POI titles by shortening the existing POI titles. The short POI title generation module 111 shortens a POI title by removing an unnecessary administrative area prefix, and/or replaces a necessary administrative area prefix with a shorter alias. To improve efficiency of the geographic-related service, the short POI titles can be generated offline in advance.

The client 120 is a computer system configured to execute software applications such as a web browser and communicate with the server 110 for the geographic-related service provided by the server 110. Examples of the client 120 include a personal computer, a mobile telephone, a personal digital assistant (PDA), etc. A user can use the client 120 to submit a request to the server 110 for a map and view the map received from the server 110.

The network 130 enables communications between the server 110 and the client 120. In one embodiment, the network 130 uses standard communication technologies and/or protocols. The network 130 which is typically the Internet, but may also be any network, including but not limited to any combination of a LAN, a MAN, a WAN, a mobile, wired or wireless network, a private network, or a virtual private network. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

Computer Architecture

Figure 2:
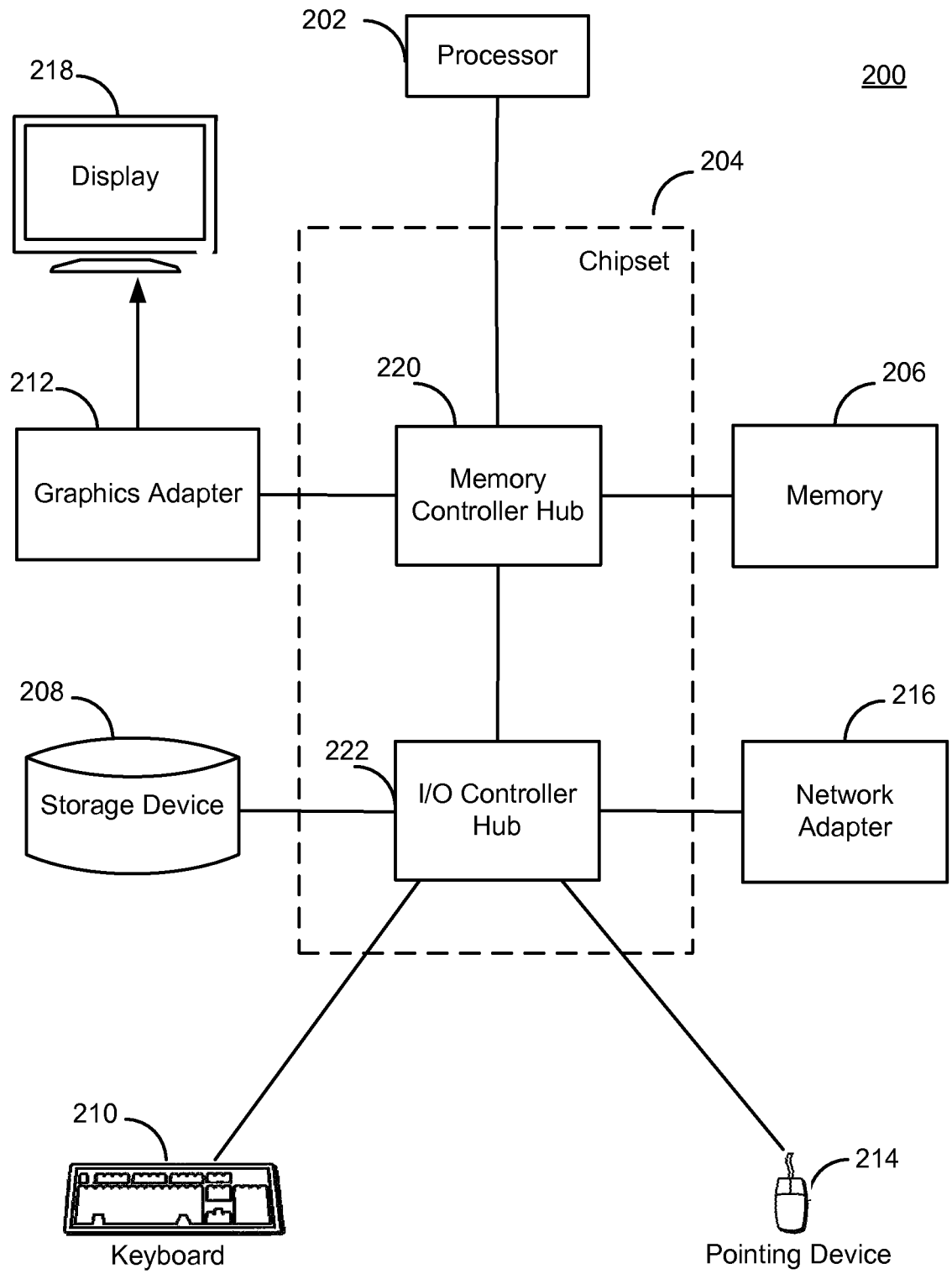
FIG. 2 is a high-level block diagram illustrating an example of a computer for use in the computing environment shown in FIG. 1 according to one embodiment of the present disclosure.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the server 110 might comprise multiple blade servers working together to provide the functionality described herein. As another example, the client 120 might comprise a mobile telephone with limited processing power. The computers 200 can lack some of the components described above, such as keyboards 210, graphics adapters 212, and displays 218.

Example Architectural Overview of the Short POI Title Generation Module

Figure 3:
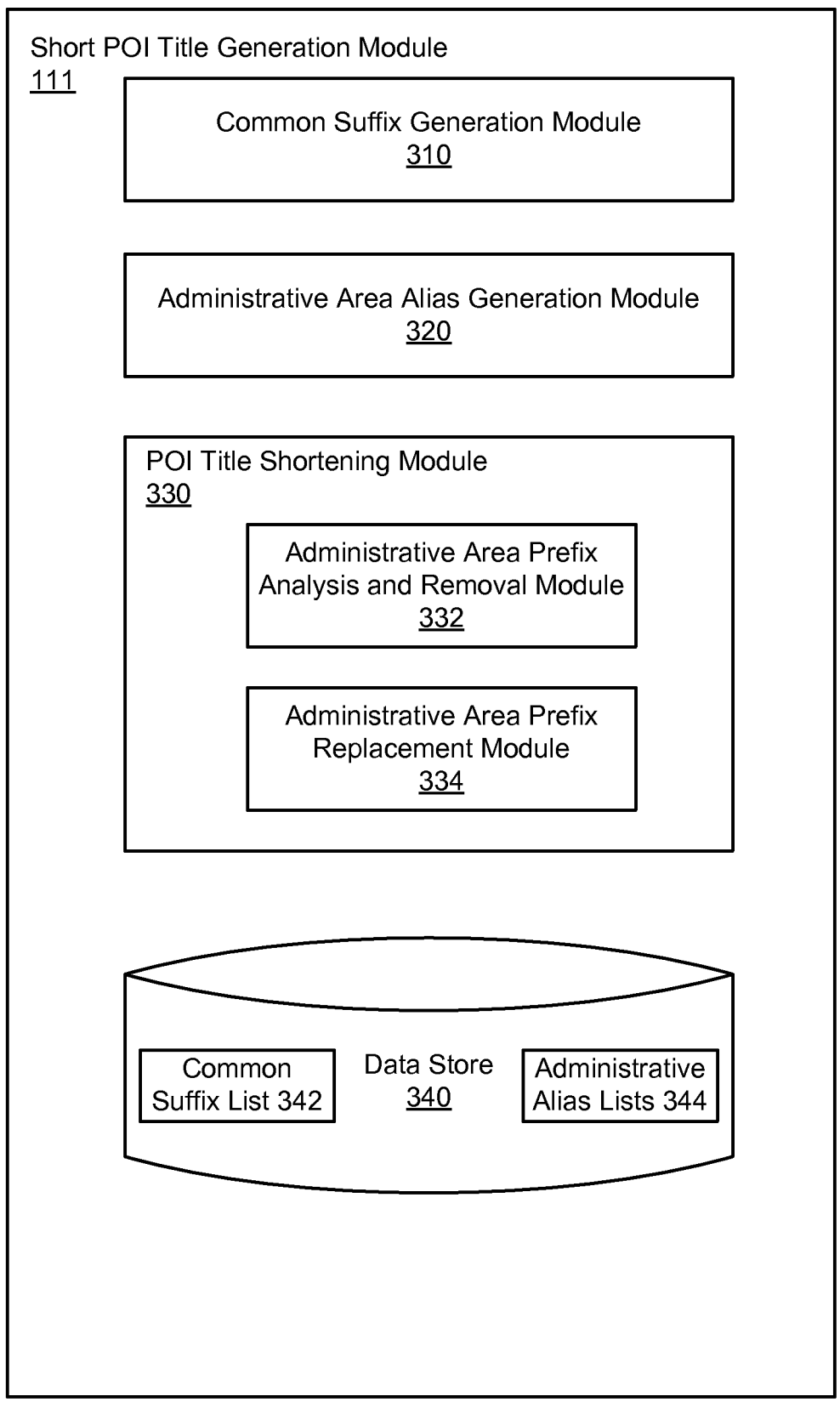
FIG. 3 is a high-level block diagram illustrating modules within a short POI title generation module according to one embodiment of the present disclosure.

FIG. 3 is a high-level block diagram illustrating a detailed view of modules within the short POI title generation module 111 according to one embodiment. Some embodiments of the short POI title generation module 111 have different and/or other modules than the ones described herein. Similarly, the functions can be distributed among the modules in accordance with other embodiments in a different manner than is described here. As illustrated, the short POI title generation module 111 includes a common suffix generation module 310, an administrative area alias generation module 320, a POI title shortening module 330, and a data store 340.

The data store 340 stores data used by the short POI title generation module 111. Examples of such data include information about POIs (e.g., locations, types, and existing titles), a common suffix list 342, information about administrative areas (e.g., official name, alias list 344, boundary information), and the generated short POI names. The data store 340 may be a relational database or any other type of database.

As described above, each POI is associated with information such as location (e.g., longitude and latitude, address), type (e.g., governmental agencies, educational institutes, retail establishments, etc.), description (e.g., amenities, rating, comments, price, etc.) and a title. A collection of POI and its associated information is stored in the data store 340 (e.g., POIs located within a region).

A common suffix is a phrase (or word) that appears in POI titles as suffix with high frequency. For example the phrase "Middle School" is a common suffix because it is commonly used as suffix in titles of POIs for middle schools. Other examples of common suffixes include "University", "People's Court", "Government", and "Hotel", to name a few. Because a common suffix appears in multiple POI titles as suffix, the common suffix is likely a general phrase that does not identify a specific POI. Therefore a properly formed POI title generally does not include the common suffix as a prefix in the title. As a result, the common suffixes can be taken into consideration in determining whether an administrative area prefix can be properly removed. For example, if the remainder of a POI title excluding the administrative area prefix includes a common suffix as a prefix then the administrative area prefix cannot be removed. For example, if an administrative area prefix "Beijing" is removed from a POI title "Beijing University Entrance", the remainder "University Entrance" includes the common suffix "University" as a prefix and is not a proper POI title (unclear which university the POI refers to). Therefore the administrative area prefix "Beijing" should not be removed from the POI title.

Each administrative area has an official name. However, in addition to the official name, an administrative area may be commonly referred to using several "alias". For example, Xinjiang province is also known as Xinjiang and Xinjiang Uygur Autonomous Region. These common aliases of an administrative area are collectively stored in an alias list of the administrative area. Each administrative area also has boundary information that defines its geographic region.

The common suffix generation module 310 generates a list of common suffixes and stores the list in the data store 340, and is one example of a means for performing this function. The common suffix generation module 310 generates common suffixes by analyzing existing POI names for suffixes with high frequency and stores the generated common suffixes in the data store 340. The process to generate common suffixes is described in further detail below with respect to FIG. 5.

The administrative area alias generation module 320 generates administrative area aliases for relevant administrative areas, and is one example of a means for performing this function. Depending on how the administrative area alias generation module 320 is configured, the relevant administrative areas can be administrative areas within a given region (e.g., all districts within a city), administrative areas at a different level within which a POI (or a collection of POIs) is located, or determined dynamically based on context. For example, if the short POI title generation module 111 is generating short titles for POIs in Fuzhou city, the administrative area alias generation module 320 can determine that Fujian province, the province within which Fuzhou city locates, Fuzhou city, and all districts within Fuzhou city (e.g., Gulou district) are the relevant administrative areas. The administrative area alias generation module 320 can identify the related administrative areas by analyzing the locations of the POIs and the boundaries of the administrative areas. For each of the relevant administrative areas, the administrative area alias generation module 320 generates a list of aliases that are commonly used to address the administrative area. The administrative area alias generation module 320 can generate aliases of an administrative area by applying rules to an official name of the administrative area. The process to generate administrative area aliases is described in further detail below with respect to FIG. 6.

The POI title shortening module 330 shortens existing POI titles to generate short POI titles, and is one example of a means for performing this function. In general, the module 330 uses two different approaches to shorten a title. One approach is to remove a portion of the title that is unnecessary. The second approach is to replace a portion of a title that is necessary with a shorten "alias". In order to shorten a title of a POI, the POI title shortening module 330 determines whether the POI is located within a metropolis area (e.g., a city, a municipality), and if so, identifies the metropolis area for the POI. The POI title shortening module 330 can make the determination and identification based on the location of the POI and the boundaries of cities within the area. The POI title shortening module 330 identifies an administrative area prefix in a POI title by matching the POI title with aliases of the relevant administrative areas, and determines whether the administrative area prefix is necessary to identify the POI. That is, the POI title shortening module 330 determines whether the remainder portion of the title excluding the administrative area prefix properly identifies the POI in the applicable metropolis area. If the administrative area prefix is necessary to identify the POI, the POI title shortening module 330 replaces it with a shorter alias. Otherwise, if the administrative area prefix is unnecessary in identifying the POI, the POI title shortening module 330 removes it from the title. As shown, the POI title shortening module 330 includes an administrative area prefix analysis and removal module 332 and an administrative area prefix replacement module 334.

The administrative area prefix analysis and removal module 332 analyzes POI names to identify administrative area prefixes and determines whether the prefixes (or a portion thereof) are unnecessary, and is one example of a means for performing this function. The administrative area prefix analysis and removal module 332 identifies an administrative area prefix in a POI title by matching the title with aliases in the lists of aliases of the relevant administrative areas (i.e., the alias lists for the administrative areas the POI locates within). For example, Fuzhou city No. 5 Middle School is located in Fujian province (province level), Fuzhou city (city level), and Gulou district (district level). The administrative area prefix analysis and removal module 332 matches the title of the POI representing the school with aliases of Fujian province, aliases of Fuzhou city, and aliases of Gulou district. If an alias (or a combination of aliases) matches a prefix of the POI title, the matching prefix is the administrative area prefix. The administrative area prefix analysis and removal module 332 determines whether the identified prefix is necessary by (1) determining whether the remainder of the title excluding the identified prefix includes as a prefix a suffix in the list of common suffixes stored in the data store 340, and (2) determining whether the remainder is a unique short POI title within the applicable metropolis area. If a common suffix matches the remainder as a prefix portion of the remainder, or if the remainder is not a unique short POI title within the applicable metropolis area, then the administrative area prefix analysis and removal module 332 determines that the identified prefix is necessary. Otherwise, if the remainder does not include as a prefix any of the common suffixes and the remainder is a unique short POI title within the applicable metropolis area, then the administrative area prefix analysis and removal module 332 determines that the identified prefix is unnecessary. If the prefix is determined to be unnecessary, then the administrative area prefix analysis and removal module 332 removes the unnecessary administrative area prefix from the POI title to generate a short POI title. The operation of the administrative area prefix analysis and removal module 332 is described in detail below with respect to FIGS. 7, 8A-8B.

If however, the administrative area prefix analysis and removal module 332 determines that the identified prefix is necessary, then the administrative area prefix replacement module 334 generates a short POI title by replacing the administrative area prefix with a shorter alias. The administrative area prefix replacement module 334 selects a shorter alias for the prefix from the alias list of the corresponding administrative area, and replaces the administrative area prefix with the shorter alias to generate a short POI title.

Overview of Methodology for Generating a Short POI Title

Figure 4:
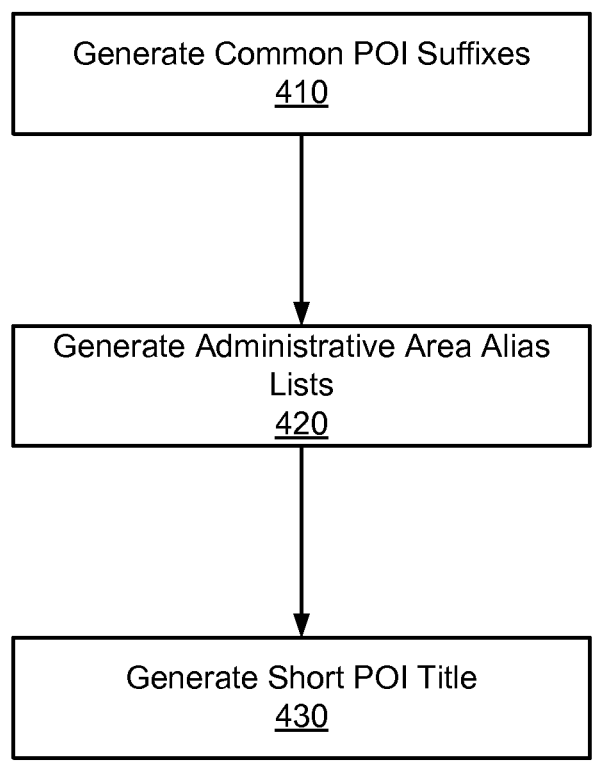
FIGS. 4, 5, 6, 7, 8A, and 8B are flowcharts that collectively illustrate the operation of the short POI title generation module according to one embodiment of the present disclosure.

FIG. 4 is a flowchart illustrating a method 400 for the short POI title generation module 111 to generate a short POI title according to one embodiment. Other embodiments can perform the steps of the method 400 in different orders. Moreover, other embodiments can include different and/or additional steps than the ones described herein. The short POI title generation module 111 can perform multiple instances of the steps of the method 400 concurrently and/or in parallel.

Initially, the short POI title generation module 111 generates 410 common POI suffixes and stores these in a list of common suffixes in the data store 340. The process to generate common POI suffixes is described in detail below with respect to FIG. 5.

The short POI title generation module 111 generates 420 administrative area alias lists for administrative areas within which a particular POI locates and stores in the data store 340. The process to generate an administrative area alias list for an administrative area is described in detail below with respect to FIG. 6.

The short POI title generation module 111 generates 430 a short POI title by shortening an existing title of the particular POI. The short POI title generation module 111 compares the existing title with the alias list corresponding to the administrative area for the POI that are determined based on the location of the POI. If an alias or a combination matches the title as a prefix, the short POI title generation module 111 determines whether the prefix (or a portion thereof) is necessary by comparing the remainder of the title, that is the portion of the title excluding the prefix, with the list of common suffixes for matches. If none of the common suffixes matches the remainder as a prefix, and the remainder is a unique shortened POI title in the applicable metropolis area, the prefix is determined unnecessary. The short POI title generation module 111 removes the unnecessary prefix (or portion) and replaces the necessary prefix (or portion) with shorter alias. The process to shorten an existing title is described in detail below with respect to FIGS. 7 and 8A-B.

After the short POI title is generated 430, the server 110 can store it in the data store 340 and avail it for subsequent use (e.g., to be embedded in a map).

Common Suffixes Generation

Figure 5:
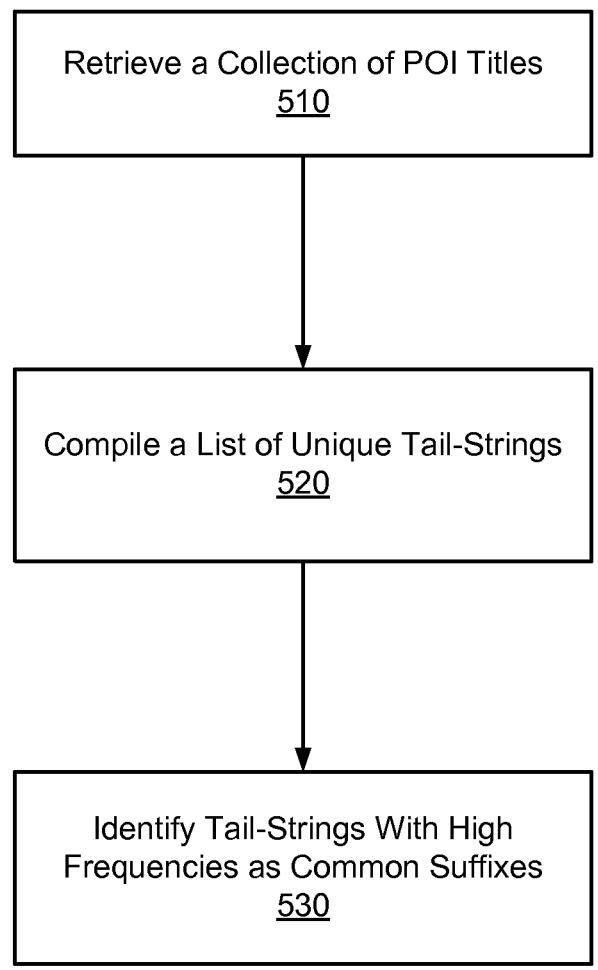

FIG. 5 is a flowchart illustrating one embodiment of a method 500 for the short POI title generation module 111 to generate a list of common suffixes. As discussed above with respect to FIG. 3, POIs of similar types use similar suffixes (e.g., "University", "People's Court", "Government", "Hotel"). These suffixes by themselves are only descriptive of the type of POI but are insufficient to identify a particular POI. As a result, they can be used to identify administrative area prefixes that are necessary in POI titles.

Accordingly, to generate the suffix list, the short POI title generation module 111 retrieves 510 a collection of existing POI titles. The collection can be titles of all known POIs or a subset of the POIs (e.g., a sampling set, a set of POIs within a geographic region). A typical collection will have about 5,000,000 to 10,000,000 POI titles.

The short POI title generation module 111 compiles 520 a list of unique tail strings by processing the collection of titles. The short POI title generation module 111 creates a list of unique tail strings of the POI titles, and keeps a count of the number of instances of each unique tail string in the list. Specifically, the short POI title generation module 111 processes each POI title, and determines if its tail string is already in the list. If not, the short POI title generation module 111 adds the tail string to the suffix list and starts a count for it at 1. If the tail string is already included in the list, then the short POI title generation module 111 increments the count for that tail string. This is repeated until all POI titles are processed. At the end there will be a list of unique tail strings of the POI title collection.

The short POI title generation module 111 identifies 530 tail-strings with high frequencies as common suffixes. The short POI title generation module 111 can rank the tail-strings by frequency, and identify 530 those with frequencies higher than a threshold value (e.g., a threshold count, a threshold percentage, a threshold standard score) as common suffixes. A typical collection of common suffixes generated from a list of 5,000,000-10,000,000 POI titles includes approximately 1,200 common suffixes.

The short POI title generation module 111 stores the resulting common suffixes list in the data store 340. The suffix list can be reviewed by a system operator if desired.

In addition, the short POI title generation module 111 can generate and maintain multiple common suffix lists. The multiple lists can be segregated by country, region, or other criteria. For example, the short POI title generation module 111 can compile a suffix list for all POIs in P. R. China. Alternatively or additionally, the common suffix generation module 310 can compile a separate list for each specific administrative area (e.g., a province) within China.

Administrative Area Aliases Generation

Figure 6:
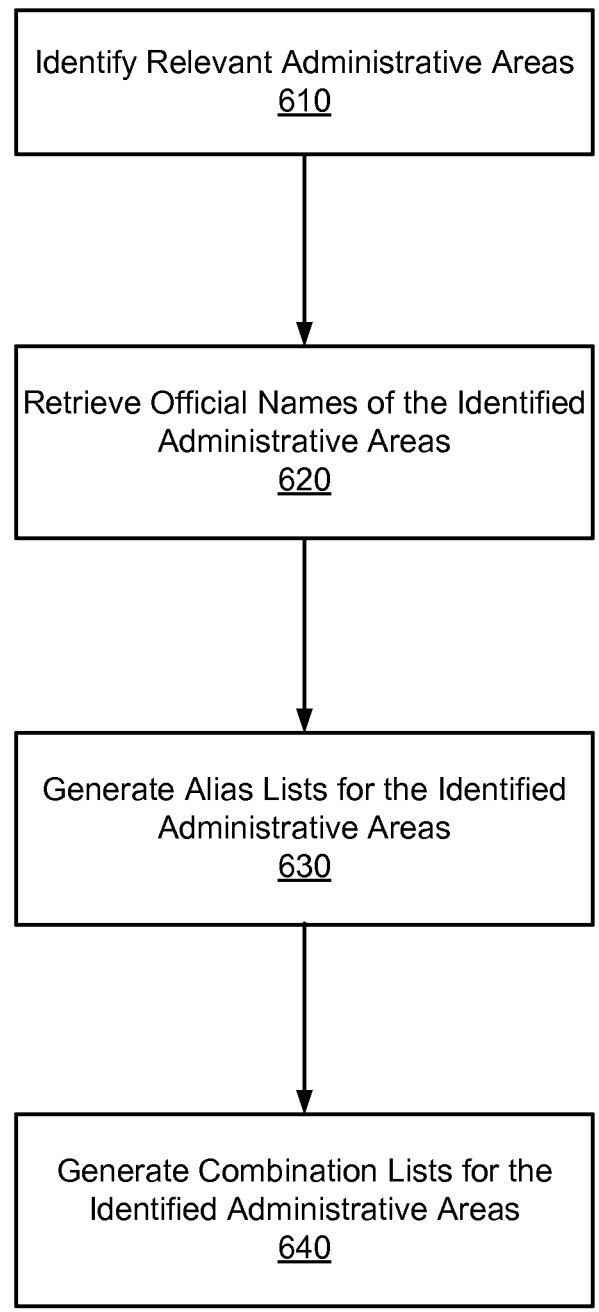

FIG. 6 is a flowchart illustrating one embodiment of a method 600 for the short POI title generation module 111 to generate lists of aliases for administrative areas relevant to a POI. As discussed above with respect to FIG. 3, a POI typically is located within multiple administrative areas at different levels in the administrative hierarchy. Each of these administrative areas can have several aliases.

The short POI title generation module 111 identifies 610 administrative areas relevant to a POI (i.e., the POI the short POI title generation module 111 processes to generate short title for), and retrieves 620 the official names of the identified administrative areas (e.g., from the data store 340). The short POI title generation module 111 can identify 610 the administrative areas based on the location of the POI and the boundaries of the administrative areas.

For each of the identified administrative areas, the short POI title generation module 111 generates 630 a list of alias by applying a set of rules applicable to the administrative area. There are two types of rules in the set, appending rules and exceptional rules. Appending rules append a phrase to the official name of administrative areas of a particular level to generate aliases. Examples of the appending rules include a province rule that appends the word "province" to the official names of province level geographic areas, a city rule that appends the word "city" to the official names of city level geographic areas, and a district rule that appends the word "district" to the official names of district level geographic areas, to name a few. Exceptional rules are rules that are applicable only to specific administrative regions, and cannot be applied to other administrative areas of the same level. For example, an exceptional rule is only applicable to the administrative area of Xinjiang province, and appends the phrase "Uygur Autonomous Region" to its official name. Seven example rules used by the module 111 to generate aliases for administrative areas are listed below.

(1) Including the official name of the administrative area as an alias.
(2) Removing official name of any of the 55 Minor Nationals contained in the official name/alias. For example, by applying rule (2), an alias for the title "BeiChuang Qiang Zu Automation county" is "BeiChuang Automation county".
(3) If the official name/alias (1) does not contain the official name of any of the 55 Minor Nationals, and (2) contains "Automation" (e.g., Automation county), then inserting the official name of each of the 55 Minor Nationals in front of "Automation" to create an alias for each of the 55 Minor National. For example, by applying rule (3), one of the 55 aliases generated for the title "BeiChuang Automation county" is "BeiChuang Qiang Zu Automation county".
(4) Removing a set of suffixes ("province", "city", "county", "Automation", "state", "Automation state", "Automation county", "district") from the official name/alias if present. For example, by applying rule (4), an alias for the title "BeiChuang Automation county" is "BeiChuang".
(5) If the official name/alias does not contain any of the set of suffixes listed in Rule (4), then adding each suffix in the set to generate a set of aliases. For example, by applying rule (5), one of the aliases generated for the title "BeiChuang" is "BeiChuang Automation county".
(6) If an official name/alias contains "Automation state" or "Automation county", removing only "Automation" from the name. For example, by applying rule (6), an alias for the title "BeiChuang Automation county" is "BeiChuang county".
(7) Removing duplicated aliases.

The short POI title generation module 111 also generates 640 alias combination lists (also called combination lists). Particularly, the short POI title generation module 111 generates the following two alias combination lists: a province-city alias combination list and a city-district alias combination list. Using the city-district alias combination list as an example, the short POI title generation module 111 generate 640 the combination list by combining each alias of the relevant city with each alias of the relevant district. The short POI title generation module 111 generates 640 a combination of two aliases by concatenating the two aliases into a single combined string. The two aliases are separated by a space symbol in the combined string.

For example, assume the city alias list includes two aliases ("Beijing City", "Beijing"), and the district alias list includes two aliases ("Haidian District" and "Haidian"). The generated combination list includes four combinations ("Beijing City Haidian District", "Beijing Haidian District", "Beijing City Haidian", and "Beijing Haidian").

The short POI title generation module 111 stores the generated alias lists and combination lists in the data store 340. In one embodiment, the alias list of an administrative area is associated with the administrative area in the data store 340.

The short POI title generation module 111 generates alias lists in advance. For example, the short POI title generation module 111 can generate a nation-wide province level alias list for all provinces of a specific country (e.g., P. R. China), city level alias lists for all cities within each province, and district level alias lists for all districts within each city. These lists can be arranged in a hierarchical tree based on the relationships among the corresponding administrative areas. Subsequently the short POI title generation module 111 can retrieve the corresponding lists from the tree as needed.

Short POI Title Generation

Figure 7:
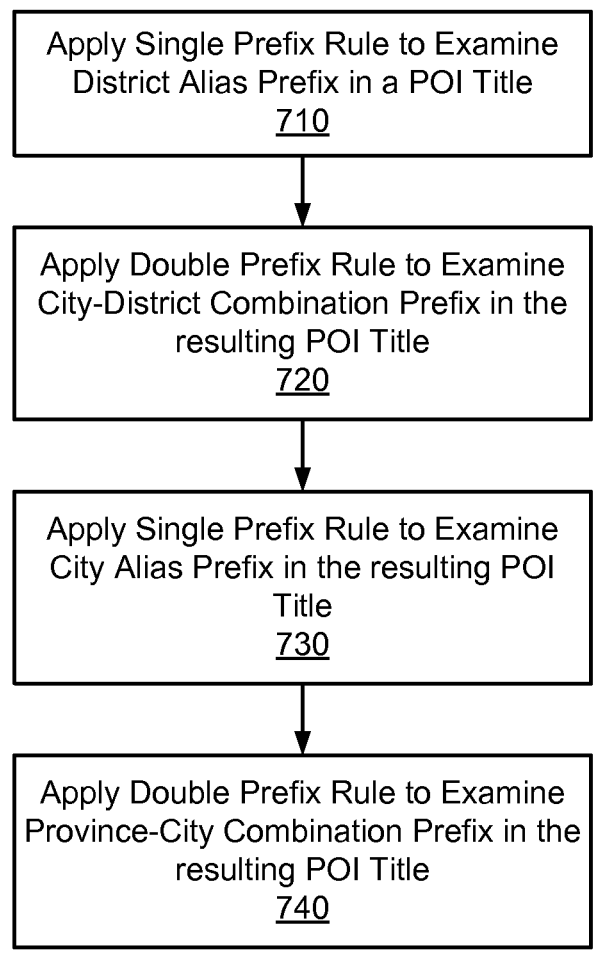

FIG. 7 is a flowchart illustrating one embodiment of a method 700 for the short POI title generation module 111 to generate a short POI title from an existing POI title. As discussed above, a POI title often include multiple administrative area names as prefix. For example, the POI title "Fuzhou City Guluo District No. 5 Middle School" includes the following two administrative area names as prefixes: "Fuzhou City" and "Gulou District". In order to consider common combinations of administrative areas in POI prefixes, the short POI title generation module 111 sequentially examines four scenarios (district alias only, city-district combination, city alias only, and province-city combination) and applies two rules (single prefix rule, double prefix rule), as detailed below to examine administrative area prefixes commonly present in a given POI title.

The short POI title generation module 111 retrieves an existing POI title of the POI from the data store 340. The short POI title generation module 111 first applies 710 the single prefix rule to the existing POI title to examine aliases in the district alias list. The single prefix rule is described in detail below with relate to FIG. 8A. The single prefix rule attempts to shorten the POI title by determining whether the POI title includes as a prefix a single administrative area alias, and if so whether the prefix is necessary.

The short POI title generation module 111 then applies 720 the double prefix rule to the resulting POI title of step 710 to examine combinations of aliases in the city alias list and aliases in the district alias list. The double prefix rule is described in detail below with relate to FIG. 8B. The double prefix rule attempts to shorten the POI title by determining whether the POI title includes as a prefix a combination of administrative area aliases, and if so whether the prefix is necessary.

The short POI title generation module 111 then applies 730 the single prefix rule to the resulting POI title of step 720 to examine aliases in the city alias list, and then applies 740 the double prefix rule to the resulting POI title of step 730 to examine combinations of aliases in the province alias list and aliases in the city alias list.

As described in detail below with respect to FIGS. 8A and 8B, in each step of the method 700, by applying the single/double prefix rule, the short POI title generation module 111 determines (1) whether a corresponding administrative area prefix exists in the POI title, and (2) if so whether it (or a portion thereof) is necessary. If a prefix (or a portion thereof) is necessary, the short POI title generation module 111 attempts to replace the prefix (or the portion) with a shorter alias, and if the prefix is unnecessary the short POI title generation module 111 removes the prefix (or the portion) from the POI title, and thereby generating a short POI title.

Single Prefix Rule

Figure 8A:
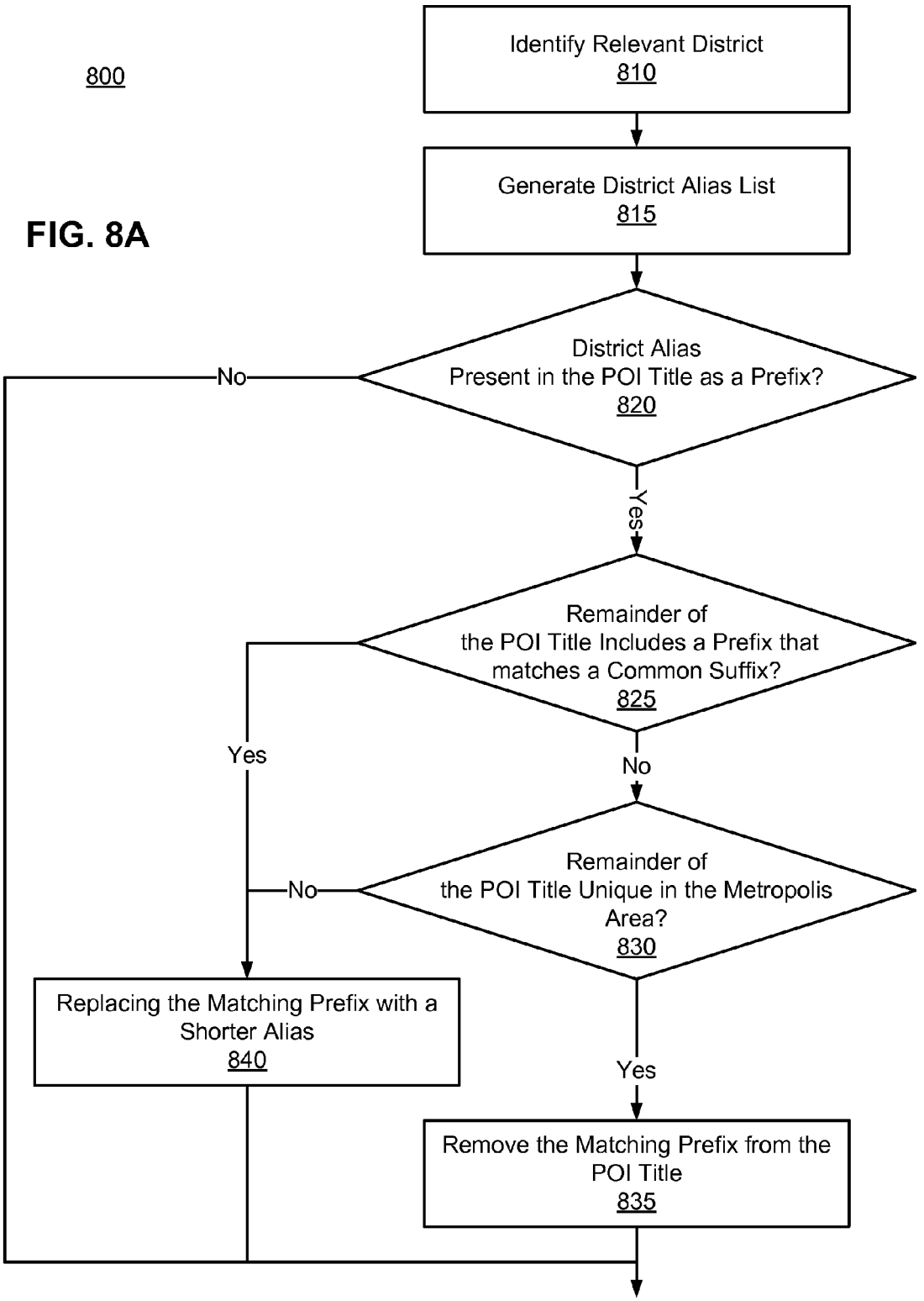

FIG. 8A is a flowchart illustrating a method 800 for the short POI title generation module 111 to apply a single prefix rule to shorten a POI title according to one embodiment. As described above, the short POI title generation module 111 applies the single prefix rule for the following two scenarios: the district alias only scenario and the city alias only scenario. The single prefix rule is described in detail below as applied to the district alias only scenario. The application of the single prefix rule to the city alias only scenario is similar.

The short POI title generation module 111 identifies 810 the relevant district for a particular POI and generates 815 the district alias lists as described above with respect to FIG. 6. The district alias lists can be generated in advance and stored in the data store 340 and retrieved subsequently when needed. The short POI title generation module 111 matches the POI title with the district aliases in the district alias list, and determines 820 whether any of the aliases is present in the POI title as a prefix. The short POI title generation module 111 may sort the aliases in the district alias list by length, longest first, and match the aliases with the POI title in the sorted order. If the short POI title generation module 111 determines 820 that none of the aliases in the alias list is present as a prefix in the POI title, the short POI title generation module 111 finishes applying the single prefix rule for the current scenario.

Otherwise, if the short POI title generation module 111 determines 820 that a district alias is present in the POI title as a prefix, the short POI title generation module 111 determines 825 whether the remainder of the POI title excluding the prefix includes a common suffix as a prefix. The "remainder" of the POI title is that portion of the title that does not include the matched prefix.

In other words, the short POI title generation module 111 determines whether one of the common suffixes appears in the remainder of the title, operating as a prefix. For example, the common suffix "University" serves as a prefix of the remainder "University Entrance" after the prefix "Beijing" is removed from the POI title "Beijing University Entrance".

The short POI title generation module 111 makes the determination 825 by comparing the remainder with common suffixes in the common suffix list.

If the remainder includes as a prefix a common suffix, then the short POI title generation module 111 replaces 840 the matching prefix with a shorter alias.

If none of the common suffixes appear as a prefix in the remainder, the short POI title generation module 111 determines 825 that the remainder does not include a common suffix as a prefix.

In this case, the module 111 determines 830 whether the remainder is a unique shortened POI title in the applicable metropolis area (if the POI is located in a metropolis area). The short POI title generation module 111 makes the determination 830 by searching the remainder and the shortest district alias (i.e., in the corresponding alias list) in the existing POI titles of all POIs within the applicable metropolis area. If there is only one hit (the POI title being processed), then the short POI title generation module 111 determines 830 that the remainder is unique, and otherwise not unique.

If the remainder is determined 830 to be unique in the metropolis area of the POI, the short POI title generation module 111 determines the district prefix to be unnecessary. This is because the remainder already uniquely identifies the POI, and thus the district prefix does not further identify the POI. In this case, the module 111 removes 835 the matching prefix from the POI title.

On the other hand, if the remainder is determined 830 to be not unique, then the prefix is still useful for identifying the POI. In this case, the short POI title generation module 111 replaces 840 the matching prefix with a shorter alias.

In one embodiment, the matching prefix is removed 835 and/or replaced 840 only if the POI does not belong to a metropolis area (e.g., the matching prefix is not an alias of a district of the metropolis area) for ease of reading. In addition, when replacing 840 the matching prefix, the short POI title generation module 111 may preserve the word "district" but not "county" in the prefix. Further, when applying the single prefix rule to the city alias only scenario, the short POI title generation module 111 may be configured not to remove the matching prefix if it matches the shortest city alias.

Double Prefix Rule

Figure 8B:
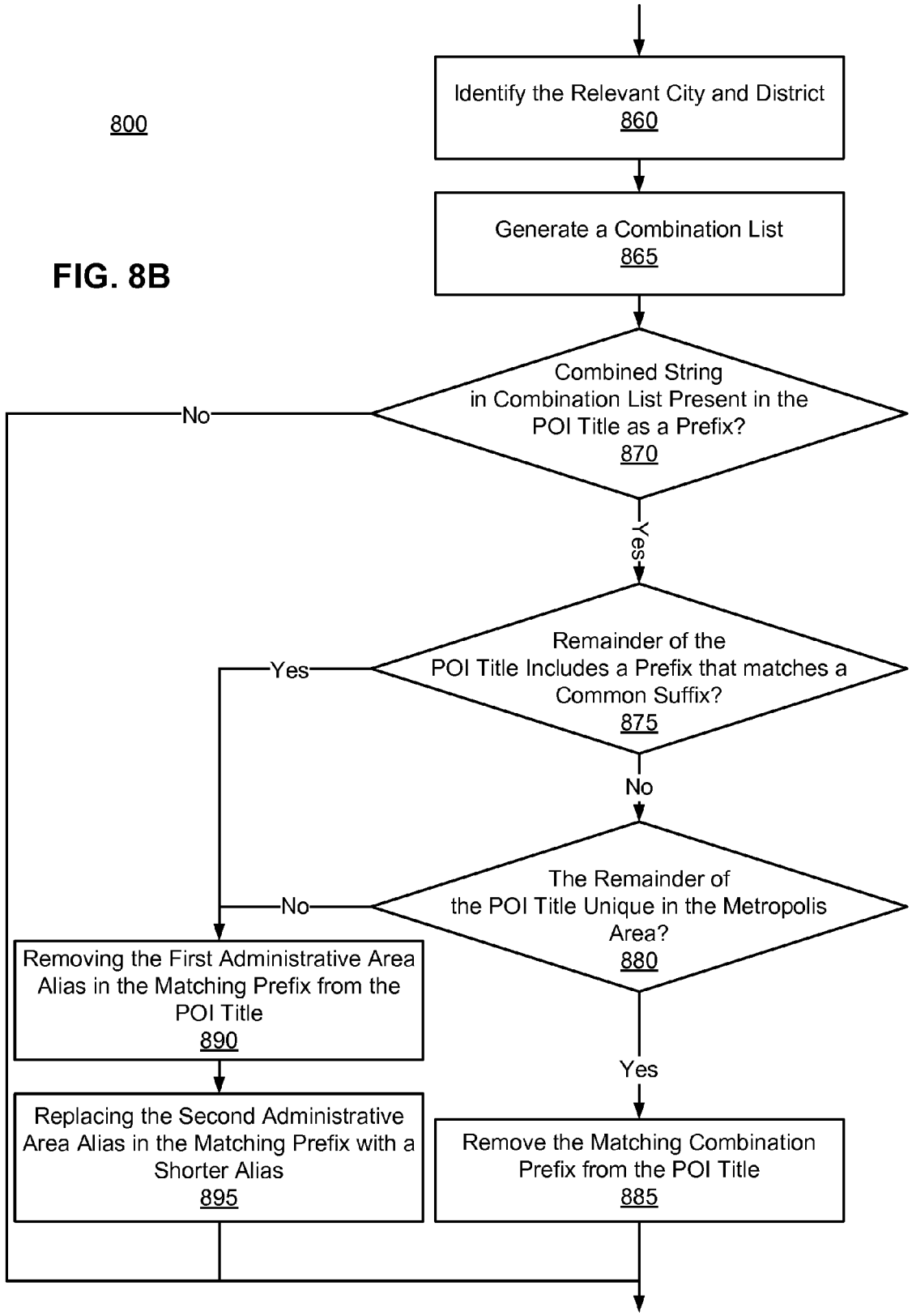

FIG. 8B is a flowchart illustrating a method 850 for the short POI title generation module 111 to apply a double prefix rule to shorten a POI title according to one embodiment. As described above, the short POI title generation module 111 applies the double prefix rule for the following two scenarios: city-district combination and province-city combination. The double prefix rule is described in detail below as applied to the city-district scenario. The application of the double prefix rule to the province-city combination scenario is similar.

The short POI title generation module 111 identifies 860 the relevant city and district for a particular POI and generates 865 the combination list as described above with respect to FIG. 6. The combination list can be generated in advance and stored in the data store 340 and retrieved subsequently when needed. The short POI title generation module 111 matches the POI title with the combined strings in the combination list, and determines 870 whether any of the combined strings is present in the POI title as a prefix. The short POI title generation module 111 may sort the combined strings by length, longest first, and match the combined strings in the sorted order. If none of the combined strings is present as a prefix in the POI title, the short POI title generation module 111 finishes applying the double prefix rule for the current scenario.

Otherwise, if the short POI title generation module 111 determines 870 that a combined string is a prefix of the POI title, the short POI title generation module 111 determines 875 whether the remainder of the POI title excluding the prefix includes as a prefix a common suffix. The short POI title generation module 111 makes the determination 875 by comparing the remainder with common suffixes in the common suffix list. If none of the common suffixes matches the remainder as a prefix, the short POI title generation module 111 determines 875 that the remainder does not include as a prefix a common suffix, and determines 880 whether the remainder is a unique shortened POI title in the applicable metropolis area (if the POI is located in a metropolis area). The short POI title generation module 111 makes the determination 880 by searching the remainder and the shortest city alias (e.g., "Beijing") in the existing POI titles of all POIs within the applicable metropolis area. If there is only one hit (the POI title being processed), then the short POI title generation module 111 determines 880 that the remainder is unique, and otherwise not unique.

If the remainder is determined 880 to be unique in the metropolis area of the POI, the short POI title generation module 111 determines the city-district combination prefix to be unnecessary, and removes 885 the combination prefix from the POI title. On the other hand, if the remainder is determined 875 including as a prefix a common suffix, or if the remainder is determined 880 to be not unique, the short POI title generation module 111 removes 890 the first administrative area alias in the matching prefix (the city alias for the city-district scenario, and the province alias for the province-city scenario) from the POI title, and replaces 895 the second administrative area alias in the matching prefix (the district alias for the city-district scenario, and the city alias for the province-city scenario) with a shorter (e.g., shortest) alias.

In one embodiment, the second administrative area alias is replaced 895 with a shorter alias only if the POI does not belong to a metropolis area (e.g., the alias is not an alias of a district of the metropolis area) for ease of reading.

Example

Figures 9A, 9B:
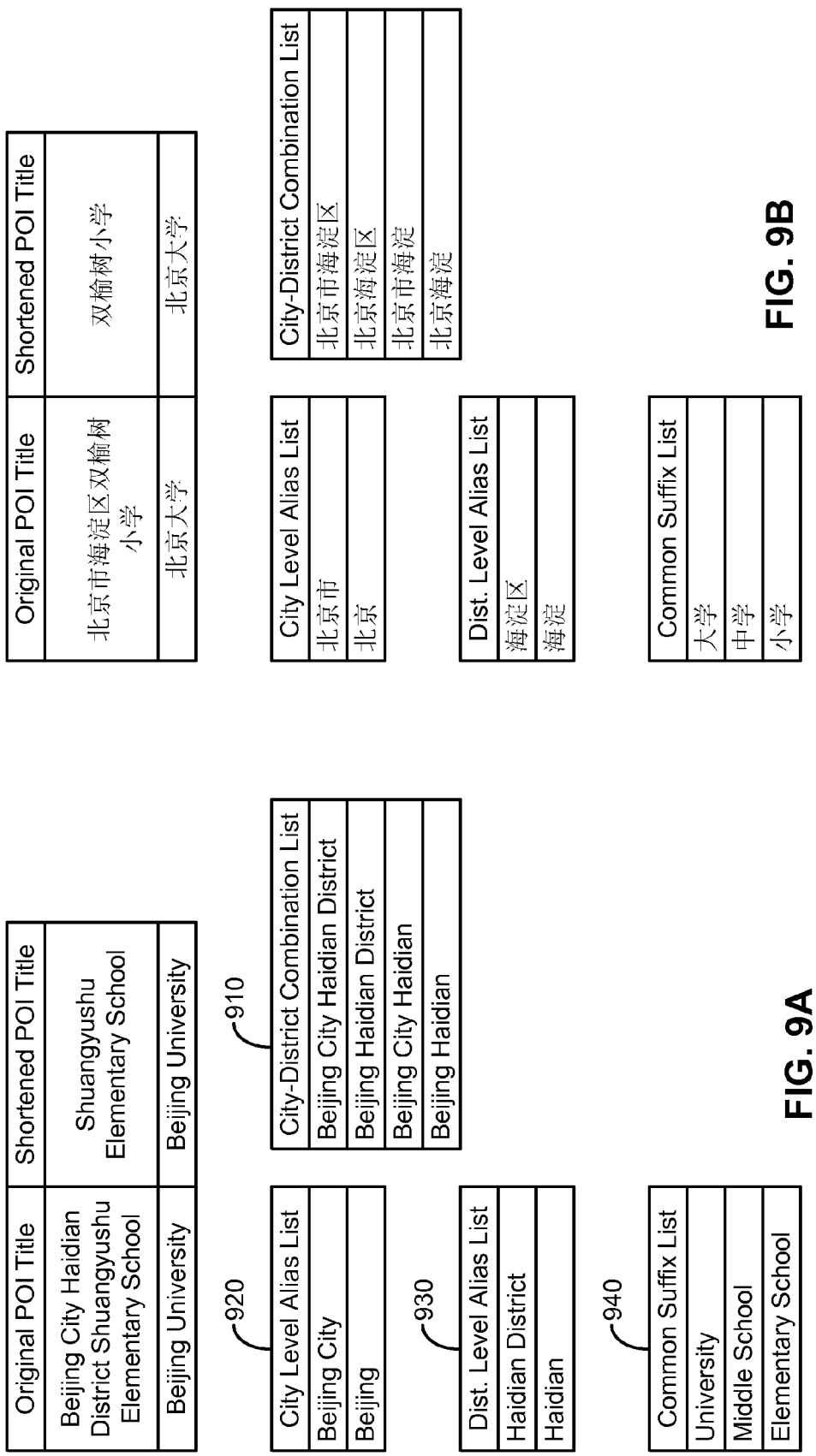
FIGS. 9A and 9B are diagrams illustrating examples of generated short POI titles in English and Chinese according to one embodiment of the present disclosure.

FIG. 9A include tables illustrates two examples of existing POI titles and corresponding short POI titles generated by the short POI title generation module 111 according to one embodiments. As shown the two existing POI titles are "Beijing City Haidian District Shuangyushu Elementary School" and "Beijing University". The generated common suffix list 940 includes the following suffixes: "University", "Middle School", and "Elementary School". The generated city level alias list 920 includes the following aliases: "Beijing City" and "Beijing". The generated district level alias list 930 includes the following aliases: "Haidian District" and "Haidian". The generated city-district combination list 910 includes the following combined strings: "Beijing City Haidian District", "Beijing Haidian District", "Beijing City Haidian", and "Beijing Haidian".

The short POI title generation module 111 applies 710 the single prefix rule to the POI title "Beijing City Haidian District Shuangyushu Elementary School" and locates no matching suffix since the prefix "Beijing City" is not a district alias. The short POI title generation module 111 applies 720 the double prefix rule to the POI title and determines that (1) the title contains a matching prefix "Beijing City Haidian District", (2) the remainder "Shuangyushu Elementary School" does not have a common suffix as a prefix, and (3) the remainder is unique in the applicable metropolis area (Beijing city). As a result, the output of the double prefix rule is the short POI title "Shuangyushu Elementary School". The short POI title generation module 111 applies 730 and 740 the single/double prefix rules without locating matching prefix. Therefore, the short POI title generation module 111 correctly generated a short POI title "Shuangyushu Elementary School" by removing unnecessary administrative area prefix from the existing title "Beijing City Haidian District Shuangyushu Elementary School".

The short POI title generation module 111 applies 710 the single prefix rule to the POI title "Beijing University" and locates no matching prefix since the prefix "Beijing" is not a district alias. The short POI title generation module 111 applies 720 the double prefix rule to the POI title and locates no matching prefix since the POI title does not contain district level alias. The short POI title generation module 111 applies 730 the single prefix rule to the POI title and determines that (1) the title contains a matching prefix "Beijing", (2) the remainder "University" has a common suffix "University" as a prefix, and (3) the remainder is not unique in the applicable metropolis area (Beijing city). The short POI title generation module 111 attempts to shorten the prefix "Beijing" without success because it does not have shorter alias. As a result, the output of the single prefix rule is the original POI title "Beijing University". The short POI title generation module 111 applies 740 the double prefix rules without locating matching prefix. Therefore, the short POI title generation module 111 correctly generated a POI title "Beijing University" by determining that the prefix "Beijing" cannot be removed or replaced.

FIG. 9B includes the corresponding Chinese POI titles, common suffix list, alias/combination lists to illustrate that the present disclosure can be used to properly generate short POI titles in other languages, such as Chinese.

Additional Embodiment

The above described province/city/district levels administrative area names are illustrative and the short POI title generation module 111 can analyze and remove (or replace with shorter alias) other administrative areas. For example, the short POI title generation module 111 can examine the POI title for country name as a prefix, and apply the single prefix rule to determine whether to remove the country name prefix.

The short POI title generation module 111 can utilize existing technology to further shortening the POI titles. For example, the short POI title generation module 111 can use language segmentation technology to divide a POI title into several segments and apply the above described techniques to one or more of the segments to further shortening the POI title.

In an additional embodiment, the short POI title generation module 111 dynamically determines the applicable metropolis area based on a current context. For example, if a user of the client 120 zooms a map to a city level, then the short POI title generation module 111 uses the city level as the metropolis area, and if the user zooms to a district level then the short POI title generation module 111 uses the current district as the metropolis area.

In one embodiment, the short POI title generation module 111 ignores the differences between a capital letter and the corresponding lowercase letter when conducting matches and comparisons. For example "Beijing City" and "Beijing city" are deemed the same by the short POI title generation module 111. In addition, a prefix/suffix of a string includes the string itself.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for generating short POI titles. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for generating a short title for a geographic point-of-interest (POI), the method executed by a computer system and comprising:
   storing a list of common POI suffixes, the POI suffixes appearing in titles of a plurality of POIs;
   storing aliases of a city, a province, and a plurality of districts, the city located within the province and comprising the plurality of districts;
   identifying a POI located within one of the plurality of districts, wherein the POI has a title including a prefix and a suffix;
   matching the prefix of the title of the POI with an alias of an administrative area including the POI, the administrative area comprising one of the following:
   the province, the city, and said district;
   determining a remainder of the title excluding the matched prefix;
   determining whether the remainder of the title includes as a prefix a suffix in the list of common POI suffixes; and
   responsive to the remainder not including as a prefix any suffix in the list of common POI suffixes, removing the prefix from the title of the POI.

2. The computer-implemented method of claim 1, further comprising:
   determining whether the remainder is a unique short title in the city;
   responsive to the remainder being determined a unique short tile in the city, removing the prefix from the title of the POI.

3. The computer-implemented method of claim 2, wherein determining whether the remainder is a unique short title comprises:
   searching the remainder and the matching prefix as keywords in titles of POIs located within the city for a search result;
   responsive to the search result including only the title of the POI, determining the remainder is a unique short title in the city.

4. The computer-implemented method of claim 1, further comprising:
   responsive to the remainder including as a prefix a suffix in the list of common POI suffix, replacing the matching prefix with a shorter alias.

5. The computer-implemented method of claim 1, further comprising:
   generating a combination of two aliases of two of the following: the province, the city, and said district;
   matching the prefix with the combination;
   determining a second remainder of the title excluding the matched combination;
   determining whether the second remainder of the title includes as a prefix a suffix in the list of common POI suffixes; and
   responsive to the second remainder not including as a prefix any suffix in the list of common POI suffixes, removing the matched combination from the title of the POI.

6. The computer-implemented method of claim 5, further comprising:
   responsive to the second remainder including as a prefix a suffix in the list of common POI suffixes, removing one of the two aliases from the title of the POI and replacing the other with a shorter alias.

7. The computer-implemented method of claim 5, further comprising:
   determining whether the second remainder is a unique short title in the city;
   responsive to the second remainder being determined a unique short tile in the city, removing the matched combination from the title of the POI.

8. A computer-readable storage medium encoded with executable computer program code for generating a short title for a geographic point-of-interest (POI), the computer program code comprising program code for:
   storing a list of common POI suffixes, the POI suffixes appearing in titles of a plurality of POIs;

storing aliases of a city, a province, and a plurality of districts, the city located within the province and comprising the plurality of districts;

identifying a POI located within one of the plurality of districts, wherein the POI has a title including a prefix and a suffix;

matching the prefix of the title of the POI with an alias of an administrative area including the POI, the administrative area comprising one of the following: the province, the city, and said district;

determining a remainder of the title excluding the matched prefix;

determining whether the remainder of the title includes as a prefix a suffix in the list of common POI suffixes; and responsive to the remainder not including as a prefix any suffix in the list of common POI suffixes, removing the prefix from the title of the POI.

9. The computer-readable storage medium of claim 8, further comprising:

determining whether the remainder is a unique short title in the city;

responsive to the remainder being determined a unique short tile in the city, removing the prefix from the title of the POI.

10. The computer-readable storage medium of claim 9, wherein determining whether the remainder is a unique short title comprises:

searching the remainder and the matching prefix as keywords in titles of POIs located within the city for a search result;

responsive to the search result including only the title of the POI, determining the remainder is a unique short title in the city.

11. The computer-readable storage medium of claim 8, further comprising:

responsive to the remainder including as a prefix a suffix in the list of common POI suffix, replacing the matching prefix with a shorter alias.

12. The computer-readable storage medium of claim 8, further comprising:

generating a combination of two aliases of two of the following: the province, the city, and said district;

matching the prefix with the combination;

determining a second remainder of the title excluding the matched combination;

determining whether the second remainder of the title includes as a prefix a suffix in the list of common POI suffixes; and responsive to the second remainder not including as a prefix any suffix in the list of common POI suffixes, removing the matched combination from the title of the POI.

13. The computer-readable storage medium of claim 12, further comprising:

responsive to the second remainder including as a prefix a suffix in the list of common POI suffixes, removing one of the two aliases from the title of the POI and replacing the other with a shorter alias.

14. The computer-readable storage medium of claim 12, further comprising:

determining whether the second remainder is a unique short title in the city;

responsive to the second remainder being determined a unique short tile in the city, removing the matched combination from the title of the POI.

15. A system for generating a short title for a geographic point-of-interest (POI), comprising:

a computer processor for executing computer program instructions;

a computer-readable storage medium having executable computer program instructions tangibly embodied thereon, the executable computer program instructions comprising instructions for:

storing a list of common POI suffixes, the POI suffixes appearing in titles of a plurality of POIs;

storing aliases of a city, a province, and a plurality of districts, the city located within the province and comprising the plurality of districts;

identifying a POI located within one of the plurality of districts, wherein the POI has a title including a prefix and a suffix;

matching the prefix of the title of the POI with an alias of an administrative area including the POI, the administrative area comprising one of the following: the province, the city, and said district;

determining a remainder of the title excluding the matched prefix;

determining whether the remainder of the title includes as a prefix a suffix in the list of common POI suffixes; and responsive to the remainder not including as a prefix any suffix in the list of common POI suffixes, removing the prefix from the title of the POI.

16. The system of claim 15, further comprising:

determining whether the remainder is a unique short title in the city;

responsive to the remainder being determined a unique short tile in the city, removing the prefix from the title of the POI.

17. The system of claim 16, wherein determining whether the remainder is a unique short title comprises:

searching the remainder and the matching prefix as keywords in titles of POIs located within the city for a search result;

responsive to the search result including only the title of the POI, determining the remainder is a unique short title in the city.

18. The system of claim 15, further comprising:

responsive to the remainder including as a prefix a suffix in the list of common POI suffix, replacing the matching prefix with a shorter alias.

19. The system of claim 15, further comprising:

generating a combination of two aliases of two of the following: the province, the city, and said district;

matching the prefix with the combination;

determining a second remainder of the title excluding the matched combination;

determining whether the second remainder of the title includes as a prefix a suffix in the list of common POI suffixes; and responsive to the second remainder not including as a prefix any suffix in the list of common POI suffixes, removing the matched combination from the title of the POI.

20. The system of claim 19, further comprising:

responsive to the second remainder including as a prefix a suffix in the list of common POI suffixes, removing one of the two aliases from the title of the POI and replacing the other with a shorter alias.

21. The system of claim 19, further comprising:
determining whether the second remainder is a unique short title in the city;
responsive to the second remainder being determined a unique short tile in the city, removing the matched combination from the title of the POI.

* * * * *